United States Patent Office 3,286,527
Patented Nov. 22, 1966

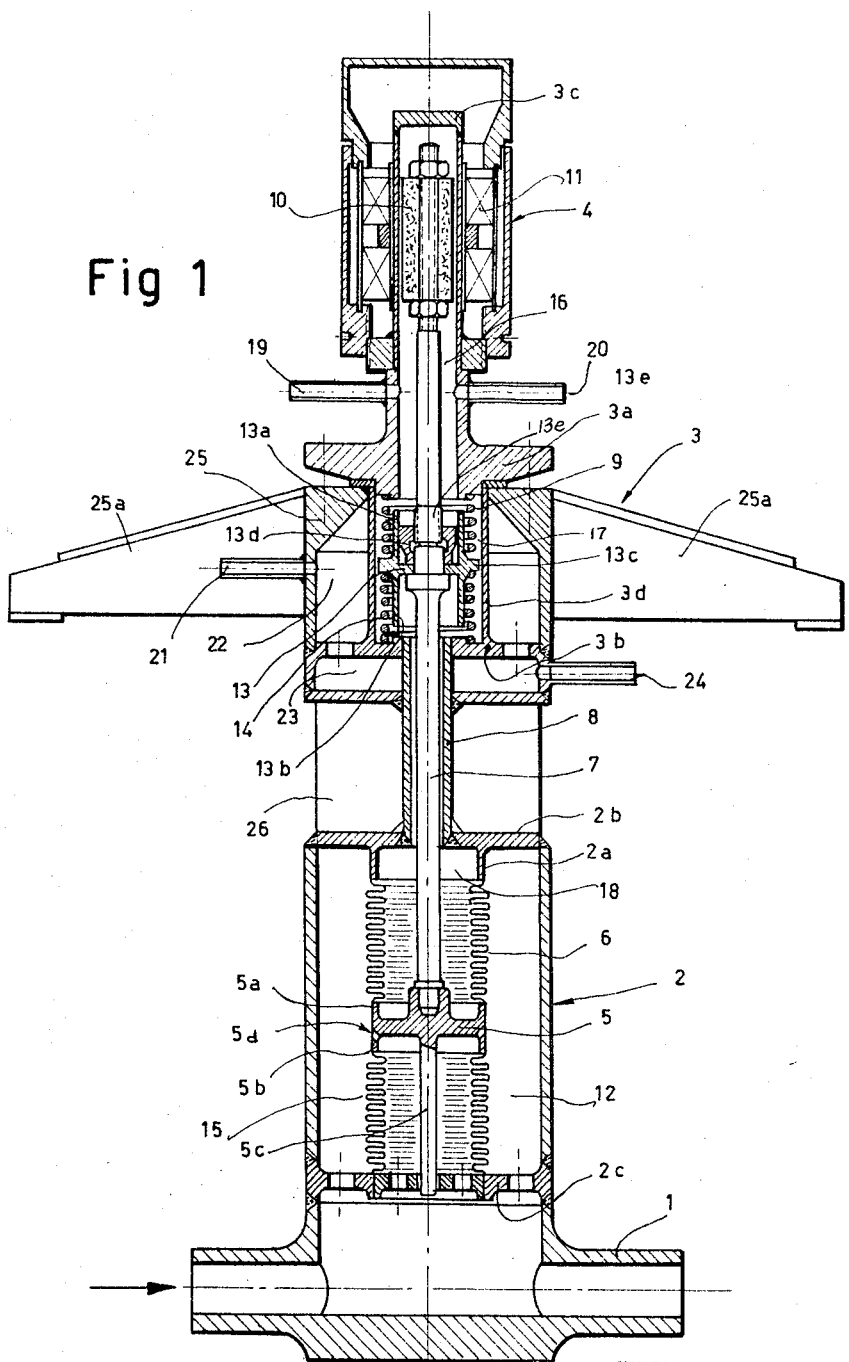

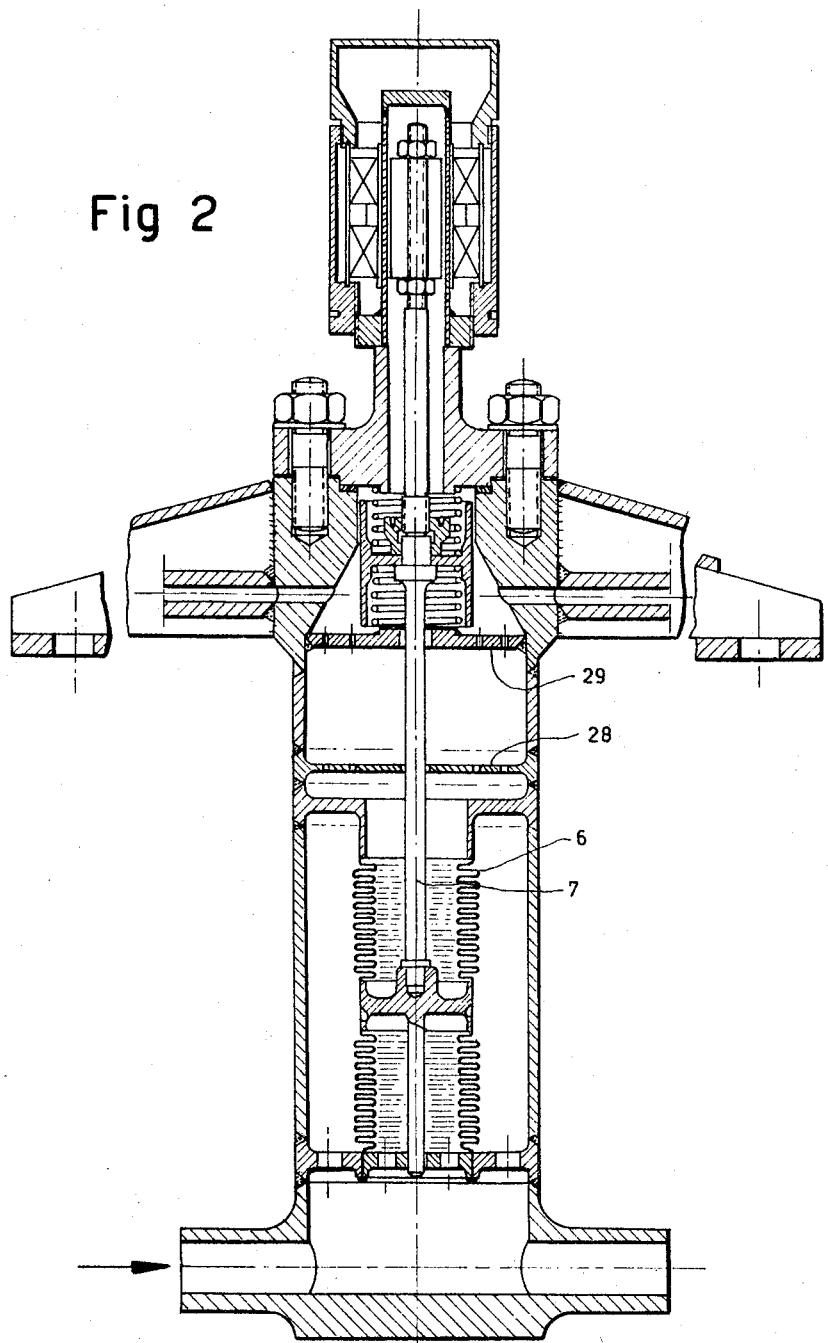

3,286,527
PRESSURE MEASURING INSTRUMENT FOR HIGH TEMPERATURE LIQUID
Bernhard Schelten-Peterssen, Varese, and Wolfgang Schulze, Ispra, Italy, assignors to European Atomic Energy Community (EURATOM), Brussels, Belgium
Filed Nov. 4, 1963, Ser. No. 321,265
Claims priority, application Germany, Dec. 11, 1962, E 24,007
3 Claims. (Cl. 73—395)

This invention relates to a pressure measuring instrument for high temperature liquid metals in which the pressure impulse is transferred to the measuring head through a pressure plate and a pressure rod, and having a return spring between the pressure rod and the upper part of the housing, a wetted bellows between the pressure plate and the housing inlet portion, and means for cooling the pressure rod between the housing inlet portion and the upper housing portion. An instrument of this basic construction is illustrated and described by way of example in "Liquid Metal Handbook" of the AEC, Department of the Navy, Washington, 1955, pages 337–338.

As shown in Figure IV–58 of the above mentioned reference, the pressure of the liquid metal which is to be monitored is picked up by a dish-like pressure plate in the housing inlet portion, that is the bottom portion of the apparatus and the chamber which connects to the conduit carrying the metal, and is transferred to a pressure rod connected with the plate. The pressure rod carries at its upper end a soft iron core which dips into a differential coil system in the housing attachment constituting the measuring head.

The above conventional pressure transferring system is further characterized, in the housing inlet portion, by a pressure bellows between the pressure plate and the housing cover; a return coil spring is mounted in the upper portion of the housing under the measuring head chamber between the pressure rod and the corresponding housing cover. The return spring seats on a spring plate which is carried by the pressure rod. In addition the spring is enclosed by a folding bellows.

Finally Figure IV–58 shows that the pressure rod in the zone between the housing inlet and the housing upper portion passes through a narrow guide pipe which is provided with cooling fins.

The above described instrument presents over pressure measuring instruments of other construction the advantage that the accuracy of the measurement is substantially independent of the thermal extension of the pressure rod and of the changes in the spring constants of the wetted pressure bellows. This can be achieved by suitable selection of the spring constants of the pressure bellows and of the spring and folding bellows combination. Furthermore, the spring and folding bellows combination is kept at low temperature and also the change in length of the pressure rod are kept small by the milling of the guide pipe.

The inventors have set themselves the object of improving the above described instrument construction in a two-fold manner: first to avoid to an even greater degree the influence of the thermal length extension of the rod, housing and elastic elements on the accuracy of the measurement, and secondly to make possible a calibration test of the instrument during operation.

In accordance with the invention these objects are attained in the present instrument having a return spring between the pressure rod and the upper part of the housing and a pressure bellows between the pressure plate and the inlet part of the housing, by providing a counter spring for the return spring on the other side of the spring plate and a counter bellows for the pressure bellows on the wetted side of the pressure plate, the ratio of the spring strengths of the return springs to that of the bellows being about 5:1, and by admitting measuring gas through conduit into the inter-communicating spaces of the pressure transfer zone up to the pressure plate.

In this manner there is achieved a very good compensation of the temperature-produced changes of the spring constants of the bellows and of the return springs, for both measuring and calibration. The compensation is so good that the accuracy of measurement of the instrument in operation lies at ±0.6% of the scale end value for a pressure variation of ±0.5. In calibration there is obtained an average measuring error of only 0.8%.

Two embodiments of the invention are illustrated by way of example in the accompanying drawing in which:
FIG. 1 is a longitudinal section of the preferred embodiment of the pressure measuring instrument and
FIG. 2 is a modification of the pressure measuring instrument according to FIGURE 1.

The pressure measuring instrument according to the invention illustrated in FIG. 1 is designed for connection to a nuclear reactor cooling circuit as well as corresponding experimental circuits, particularly those with molten metal, such as for example NaK, as the heat carrier medium. The instrument is directly connected to the conduit 1 which carries the liquid metal. The instrument can be roughly divided into a housing inlet portion 2, an upper housing portion 3, a measuring head 4 and a pressure transferring system located along the central axis of the instrument.

The pressure transferring system consists of the following elements: a pressure plate 5, a wetted pressure bellows 6 between the housing inlet portion and the pressure plate, a pressure rod 7, a pressure rod guide pipe 8, a return spring 9 between the pressure rod and the upper housing portion, a soft iron core 10 and a differential transformer 11. The space 12 in the housing inlet portion is filled with liquid metal at high temperature (up to 700° C.) from the conduit 1. The elements mentioned up to the present point are also present in the conventional pressure measuring instrument referred to hereinabove.

In accordance with the invention a counter spring 14 is set against the return spring 9 on the opposite side of the spring plate 13 and a counter bellows 15 is set against the pressure bellows 6 on the wetted side of the pressure plate 5, the ratio of the spring strengths of the return springs to those of the folding bellows being selected at about 5:1.

The spring plate and the pressure plate are both provided on both sides with collar extensions. The collars 13a and 13b of the spring plate serve to guide the coil springs 9 and 14 and serve as abutment elements for the pressure rod. The flanges 5a and 5b of the pressure plate are used for welding the ends of the folding bellows. The coil springs 9 and 14 rest respectively on the head portion 3a and the bottom portion 3b of the upper housing portion and against the flange 13c of the spring plate. The springs 9 and 14 are pre-stressed. The spring plate is securely fastened by means of a threaded nut 13d to the pressure rod 7 which is provided with a thread 13e.

The pressure bellows 6 in the housing inlet portion is welded at its upper edge to a collar 2a of the head plate 2b of the housing inlet portion, and the counter bellows 15 is welded at its lower edge to the bottom plate 2c of the housing inlet portion which is provided with openings for the liquid metal. The bottom plate itself consists of an outer annular portion and a disc inserted therein, which centers and guides the pressure rod 7 through the intermediary of a rod-like projection 5c of the pressure plate.

While the pressure bellows 6 is only wetted by the hot heat carrier on the outside thereof, the counter bellows 15 is wetted on the inside as well. To improve the circulation the pressure plate is provided with cross-ports 5d.

By the use of double springs and double bellows, and in view of the greater spring constants of the springs, the changes in the spring constants of the folding bellows are compensated, since they are both wetted by the heat carrier and are thus approximately at equal temperatures. Similarly unequal longitudinal extensions of the pressure rod and of the housing and the resulting zero point displacements in the measuring head are compensated. The position of the zero point is constant for all pressure and temperature ranges. Since the bellows can easily be kept at a temperature above 200° C., oxidation deposits of the alloyed liquid metals or direct deposits of the metal itself are not possible. The fact that the pressure rod and the springs can move freely also contributes to the accuracy of the measurement.

Further in accordance with the invention the intercommunicating spaces of the pressure transfer zone up to the pressure plate 5 are charged through a conduit with measuring gas. The gas space comprises a chamber 16 formed by the case 3c of the head portion 3a of the upper housing portion 3, the spring chamber 17, the interior of the guide pipe 8 and the bellows chamber 18. The measuring gas conduit is constituted in FIG. 1 by a supply conduit 19 and an outlet conduit 20 under the measuring head, the outlet conduit 20 leading through a rotary piston manometer to a needle valve, both of which are not shown.

The zone surrounding the spring chamber 17 is watercooled. From an inlet conduit 21 the cooling water enters into the annular chamber 22 and hence through openings in the bottom 3b of the upper housing portion it enters the water chamber 23 underneath the spring chamber and finally leaves the instrument through the outlet conduit 24. The cooling keeps the return springs at low temperature.

The annular chamber 22 is formed by a cylindrical extension 3d of the bottom portion and by a mounting 25. The cylinder 3d guides the spring plate 13. The mounting 25 has a plurality of legs 25a for supporting the pressure measuring instrument.

The guide pipe 8 of the pressure rod is also cooled, for example by cooling fins 26, which extend over the space between the upper and inlet portions of the housing.

Calibration testing of the instrument in operation is carried out as follows:

The outlet needle valve in the conduit 20 is throttled until the same pressure as in the heat carrier is set in the gas chamber of the instrument, which is constantly filled up with gas (argon) of normal operating pressure. As a result the return spring turns back the pressure rod and the instrument indicators from the operating position into the direction of the zero position. If the final position of the indicator corresponds with the zero position on the scale the measuring instrument is in order, since the gas pressure and the heat carrier pressure correspond. If this is not the case the spring system must be re-calibrated.

It will be noted that during this calibration test the collars 13a and 13b of the spring plate abut against the head and bottom portion of the upper housing portion and prevent excessive stretching of the folding bellows.

The pressure indication as such is done electrically both for the heat carrier and for the gas. Both pressures are added vectorially as positive values when the indication lies above the zero point and as negative values when the indication lies below the zero point. The sum is written and indicated, so that the heat carrier pressure can be immediately read off at any time.

The provision of a gas-measuring circuit has above all the great advantage that the measuring range of the instrument can easily be varied by raising or lowering the gas pressure, making it possible to carry out continuous pressure measurement with the same indicating instrument. There is no need to use stronger return springs which would reduce the accuracy of the readings. Furthermore, due to the negative and positive addition of the heat carrier pressure to the gas pressure, errors in measurement due to changes in the volume of the gas are avoided. The same effect is achieved in the construction of the instrument according to FIG. 1 by making the gas space of the instrument as small as possible. As a result only a small quantity of argon is carried through. In case the using up of argon gas is of no great importance, the pressure measuring instrument according to FIG. 2 may be of interest, wherein the measuring gas also serves for cooling the pressure rod and the spring assembly. Watercooling as in the instrument according to FIGURE 1 is thus omitted. In this case the springs are kept at the same temperature by a light stream of gas. The partitions 29 and 28 in the upper housing upper portion are provided with small bores to prevent the upper folding bellows 6 from coming into contact with cold gas and respectively the return springs from coming into contact with hot gas. The construction of the embodiment of FIG. 2 is otherwise identical to that of FIG. 1.

We claim:

1. In a pressure measuring instrument for high temperature liquid comprising a housing having a lower inlet portion and an upper portion, a measuring head, a pressure transfer assembly including a pressure plate and a pressure rod for transferring the pressure impulse to said measuring head, a return spring between a spring plate secured to said pressure rod and the upper portion of said housing, a wetted pressure bellows between said pressure plate and the inlet portion of said housing and means for cooling said pressure rod between said inlet and said upper portion of said housing, the improvement comprising a counter spring opposite said return spring on the opposite side of said spring plate and a counter bellows opposite said pressure bellows on the wetted side of said pressure plate, the ratio of the spring strengths of said return springs to those of said bellows being approximately 5:1, and an inter-communicating space enclosing the pressure transfer assembly up to said pressure plate, to which measuring gas is admitted through a conduit.

2. Pressure measuring instrument according to claim 1, wherein the spaces between the moving element of the pressure transfer assembly and the corresponding housing walls are of small gap.

3. Pressure measuring instrument according to claim 1, wherein said return springs are mounted in a chamber surrounded by a water-cooled jacket.

References Cited by the Examiner

UNITED STATES PATENTS

Re. 23,723  10/1953  Allwein _____ 73—393

OTHER REFERENCES

"Liquid Metal Handbook," AEC Department of the Navy, Washington, 1955, pp. 337 and 338. (Copy in Patent Office scientific library.)

LOUIS R. PRINCE, *Primary Examiner.*

D. O. WOODIEL, *Assistant Examiner.*